United States Patent
Gupta et al.

(10) Patent No.: US 7,250,091 B2
(45) Date of Patent: Jul. 31, 2007

(54) METHOD OF FORMING A SEATING SYSTEM

(75) Inventors: Vikas Gupta, East Amherst, NY (US); Hein J. Koelman, Eppstein (DE); Eric Kurtycz, Lake Orion, MI (US)

(73) Assignee: Dow Global Technologies Inc, Midland, MI (US)

(*) Notice: Subject to any disclaimer, the term of this patent is extended or adjusted under 35 U.S.C. 154(b) by 372 days.

(21) Appl. No.: 10/755,897

(22) Filed: Jan. 13, 2004

(65) Prior Publication Data

US 2004/0194877 A1 Oct. 7, 2004

Related U.S. Application Data

(60) Provisional application No. 60/447,118, filed on Feb. 13, 2003.

(51) Int. Cl.
*B60N 2/02* (2006.01)
*B60N 2/00* (2006.01)

(52) U.S. Cl. .............. 156/242; 156/293; 156/331.1; 297/353; 297/452.1

(58) Field of Classification Search ............ None
See application file for complete search history.

(56) References Cited

U.S. PATENT DOCUMENTS

| | | | |
|---|---|---|---|
| 3,054,643 A | 9/1962 | Militano | |
| 3,171,691 A | 3/1965 | Buehrig | |
| 3,245,715 A | 4/1966 | Gits | |
| 3,523,710 A * | 8/1970 | Barecki et al. | 297/216.13 |
| 3,638,997 A | 2/1972 | Shapiro et al. | |
| 3,647,260 A * | 3/1972 | Grant et al. | 297/229 |
| 3,669,496 A | 6/1972 | Chisolm | |
| 3,712,614 A | 1/1973 | Sherman | |
| 3,797,887 A * | 3/1974 | Barecki et al. | 297/452.19 |
| 4,065,182 A | 12/1977 | Braniff et al. | |
| 4,088,367 A | 5/1978 | Atkinson et al. | |
| 4,133,579 A | 1/1979 | Springfield | |
| 4,142,757 A | 3/1979 | Fogle, Jr. et al. | |
| 4,152,023 A | 5/1979 | Buhk | |
| 4,246,734 A | 1/1981 | Fogle, Jr. et al. | |
| 4,350,390 A | 9/1982 | Ogawa | |
| 4,478,899 A | 10/1984 | Mayumi et al. | |

(Continued)

FOREIGN PATENT DOCUMENTS

DE 4208150 9/1993

(Continued)

OTHER PUBLICATIONS

International Search Report and the Written Opinion dated Jul. 21, 2004 for International Application No. PCT/US2004/003940.

(Continued)

*Primary Examiner*—Richard Crispino
*Assistant Examiner*—Barbara J. Musser
(74) *Attorney, Agent, or Firm*—Dobrusin & Thennisch PC

(57) ABSTRACT

The present invention discloses a seating system that includes a seat back (20) with one or more plastic panels (22) that extend across a lateral distance of the seat back (20). The seat back (20) preferably includes one or more reinforcements (30) attached to the plastic panels (22).

47 Claims, 2 Drawing Sheets

U.S. PATENT DOCUMENTS

| | | | |
|---|---|---|---|
| 4,489,031 A * | 12/1984 | Ogihara | 264/294 |
| 4,530,541 A | 7/1985 | Resag et al. | |
| 4,595,238 A | 6/1986 | Goldner | |
| 4,711,493 A | 12/1987 | Schrom et al. | |
| 4,804,225 A | 2/1989 | Fourrey et al. | |
| 4,892,355 A | 1/1990 | Fend | |
| 4,986,600 A | 1/1991 | Leblanc et al. | |
| 5,029,942 A | 7/1991 | Rink | |
| 5,100,204 A | 3/1992 | Makihara et al. | |
| 5,106,928 A | 4/1992 | Skoultchi et al. | |
| 5,133,588 A | 7/1992 | Hutchinson et al. | |
| 5,224,756 A | 7/1993 | Dukatz et al. | |
| 5,253,924 A | 10/1993 | Glance | |
| 5,280,995 A | 1/1994 | Elton | |
| 5,282,667 A | 2/1994 | Elton et al. | |
| 5,298,587 A | 3/1994 | Hu et al. | |
| 5,320,875 A | 6/1994 | Hu et al. | |
| 5,375,914 A | 12/1994 | Donnelly | |
| 5,433,786 A | 7/1995 | Hu et al. | |
| 5,437,498 A | 8/1995 | Waelde | |
| 5,494,712 A | 2/1996 | Hu et al. | |
| 5,499,859 A | 3/1996 | Angell | |
| 5,539,070 A | 7/1996 | Zharov et al. | |
| 5,540,479 A | 7/1996 | Thomas et al. | |
| 5,575,533 A | 11/1996 | Glance | |
| 5,597,205 A | 1/1997 | Glance et al. | |
| 5,601,334 A | 2/1997 | Marks | |
| 5,603,550 A | 2/1997 | Holdampf et al. | |
| 5,658,408 A | 8/1997 | Frantz et al. | |
| 5,686,544 A | 11/1997 | Pocius | |
| 5,700,054 A | 12/1997 | Lang | |
| 5,704,685 A | 1/1998 | Handa et al. | |
| 5,713,634 A | 2/1998 | Koike | |
| 5,718,977 A | 2/1998 | Pocius | |
| 5,722,732 A | 3/1998 | Haldenwanger | |
| 5,743,593 A | 4/1998 | Vogt | |
| 5,837,958 A | 11/1998 | Fornsel | |
| 5,846,377 A | 12/1998 | Frantz et al. | |
| 5,855,706 A | 1/1999 | Grewell | |
| 5,883,208 A | 3/1999 | Deviny | |
| 5,895,096 A | 4/1999 | Massara | |
| 5,951,110 A | 9/1999 | Conner et al. | |
| 5,968,431 A | 10/1999 | Ang et al. | |
| 5,984,419 A | 11/1999 | Partington et al. | |
| 6,027,171 A | 2/2000 | Partington et al. | |
| 6,059,369 A | 5/2000 | Bateson et al. | |
| 6,062,649 A | 5/2000 | Nagel et al. | |
| 6,074,004 A * | 6/2000 | Carmichael | 297/216.14 |
| 6,079,781 A | 6/2000 | Tilley | |
| 6,168,239 B1 | 1/2001 | Conner et al. | |
| 6,250,680 B1 | 6/2001 | Moker | |
| 6,286,902 B1 | 9/2001 | Yoshimura | |
| 6,328,386 B1 | 12/2001 | Good | |
| 6,491,346 B1 | 12/2002 | Gupta et al. | |
| 6,536,844 B2 | 3/2003 | Huse | |
| 6,557,929 B2 | 5/2003 | Fox et al. | |
| 6,679,558 B2 | 1/2004 | Adams et al. | |
| 6,688,700 B2 | 2/2004 | Gupta et al. | |
| 6,733,064 B2 | 5/2004 | Fox et al. | |
| 6,739,673 B2 | 5/2004 | Gupta | |
| 2001/0030455 A1 * | 10/2001 | Craft et al. | 297/248 |
| 2002/0058764 A1 | 5/2002 | Sonnenschein et al. | |
| 2002/0144808 A1 | 10/2002 | Jones | |
| 2002/0148427 A1 | 10/2002 | Jones et al. | |
| 2003/0001410 A1 | 1/2003 | Cate et al. | |
| 2003/0062759 A1 | 4/2003 | Gupta et al. | |

FOREIGN PATENT DOCUMENTS

| | | |
|---|---|---|
| DE | 197 28 052 A1 | 1/1999 |
| FR | 2420424 | 10/1979 |
| FR | 2698832 | 6/1994 |
| FR | 2 771 699 | 12/1998 |
| FR | 2 816 262 A1 | 5/2002 |
| JP | 60024917 A | 2/1985 |
| JP | 60024918 A | 2/1985 |
| JP | 61114835 A | 6/1986 |
| JP | 03047728 A | 2/1991 |
| WO | WO 97/07151 | 2/1997 |
| WO | WO 99/52703 | 10/1999 |
| WO | WO 01/44311 | 6/2001 |
| WO | WO 01/92051 | 12/2001 |
| WO | WO 03/016091 A1 | 2/2003 |

OTHER PUBLICATIONS

Search Report dated Feb. 12, 2004 for International Application No. PCT/US03/30124.
Search Report dated Oct. 23, 2002 for International Application No. PCT/US02/25184.
Search Report dated Oct. 29, 2001 for International Application No. PCT/US01/16266.
Co-pending U.S. Appl. No. 09/466,321, filed Dec. 17, 1999 (Dow Ref. No. 60043).
Co-pending U.S. Appl. No. 60/312,874, filed Aug. 15, 2001.
Co-pending U.S. Appl. No. 60/335,430, filed Oct. 31, 2001.
Co-pending U.S. Appl. No. 10/776,087, filed Feb. 11, 2004.
Co-pending U.S. Appl. No. 10/739,875, filed Dec. 18, 2003.
Co-pending U.S. Appl. No. 10/668,649, filed Sep. 23, 2002.
"The Scene", GE Plastics, Issue 9, Summer 2000.
Nuss, Rudolf; and Litjens, Frank, "Design and Development of a New Rear Seat Back Made From Glass Mat Thermoplastic Materials," GE Plastics, p. 1-2, Sep. 2000.
"Injection Molding Gas Assist Technology Guide", GE Plastics, pp. 1-40, date unknown.

* cited by examiner

METHOD OF FORMING A SEATING SYSTEM

CLAIM OF BENEFIT OF FILING DATE

The present application claims the benefit of the filing date of U.S. Provisional Application Ser. No. 60/447,118, filed Feb. 13, 2003, hereby incorporated by reference.

TECHNICAL FIELD

The present invention relates to an improved seating system, and more particularly to an improved system for automotive vehicle seating. The present invention also relates to improved automotive vehicle interior systems.

BACKGROUND

There is an ever-growing need for improved seating systems in automotive vehicles. The surge in popularity of hatchbacks, sport utility vehicles and minivans, has posed unique design challenges, in view of the need for seating to be adjustable and in many instances to restrain cargo carried toward the rear of the vehicle. In light of the increased consumer usage of these vehicles for stowage and transport of cargo along with passengers (particularly passengers in rear seats), manufacturers have turned their attention to improving the ability of the seating systems to withstand large loads.

For increasing the load bearing ability of the seating systems, one or more reinforcements may be applied thereto. In addition to having load bearing characteristics, it may be desirable to maintain lower costs for the seating system by using lower cost materials and streamlined processing. Thus, certain embodiments of the present invention may seek to reinforce the seating system with lower cost reinforcements, which may be applied according to techniques which can lower assembly cycle times, equipment costs, labor costs or the like.

Examples of advantageous improved systems for seating are disclosed in commonly owned U.S. Pat. No. 6,491,346 and in commonly-owned and co-pending U.S. application Ser. No. 09/766,792 (filed Jan. 22, 2001), Ser. No. 60/312,874 (filed Aug. 15, 2001), Ser. No. 60/329,187; filed Oct. 12, 2001, Ser. No. 09/766,792 (filed Jan. 22, 2001) and Ser. No. 10/216,970 (filed Aug. 12, 2002); Ser. No. 60/414,040 (filed Sep. 27, 2002); the teachings of which are hereby expressly incorporated by reference herein for all purposes.

SUMMARY OF THE INVENTION

The needs in the art are met by the automotive vehicle seating system of the present invention, which includes a plastic seat back having at least one panel substantially defined by an outer periphery and having a main wall that substantially continuously spans between the entirety of the periphery. The at least one panel preferably includes one or more reinforcement structures for providing strength to the seat back when assembled. According to one highly preferred embodiment, the panel includes a reinforcement structure having a reinforcement formed of a secondary material. While the reinforcement may be formed of a variety of secondary materials, one preferred material is metal and one particularly preferred material is steel.

Although other methods of formation are contemplated, the panel of the seat back is preferably formed in a molding process. Moreover, in one highly preferred embodiment, the reinforcement is attached to the seat back with an adhesive. In the highly preferred embodiment, the seat back may be formed of a variety of materials, but is preferably formed of plastic, more preferably formed of polypropylene and even more preferably formed of glass fiber reinforced polypropylene.

Advantageously, the seating system displays no fragmentation upon rapid acceleration up to about 20 to about 30 g, with at least a 36 kg mass placed behind the seat back. The system is easy to manufacture and includes an easily attached reinforcement such that cost of forming the seat back may be reduced.

DETAILED DESCRIPTION OF THE PREFERRED EMBODIMENT

According to one aspect of the present invention, a seat back system having at least one reinforcment structure is provided, and particularly, a seat back having one or more reinforcement structures that include a reinforcement formed of a secondary material. Preferably, the reinforcement extends along a main wall of the seat back panel. Advantageously, according to the present invention, a reinforcement of one desirable material (e.g., metal) may be easily attached (e.g., adhered) to seat backs of another different desirable material where attachments of such first and second materials may have previously been much more difficult.

Figure 1:
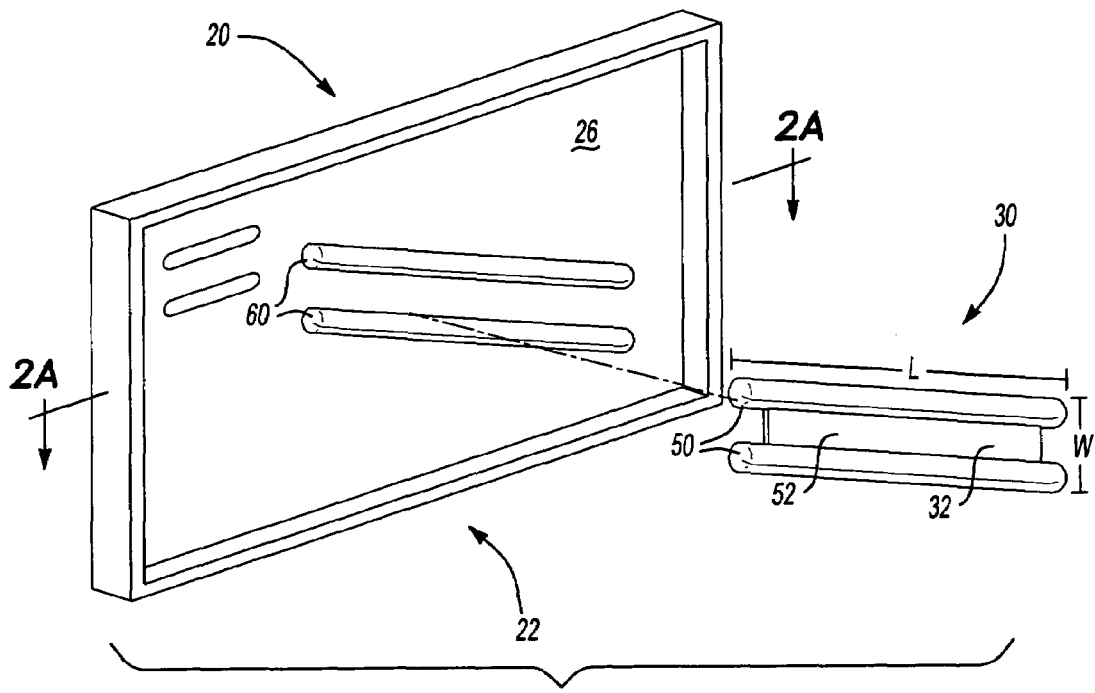
FIG. 1 is a perspective view of a seat back during application of a reinforcement.
Figure 2A:
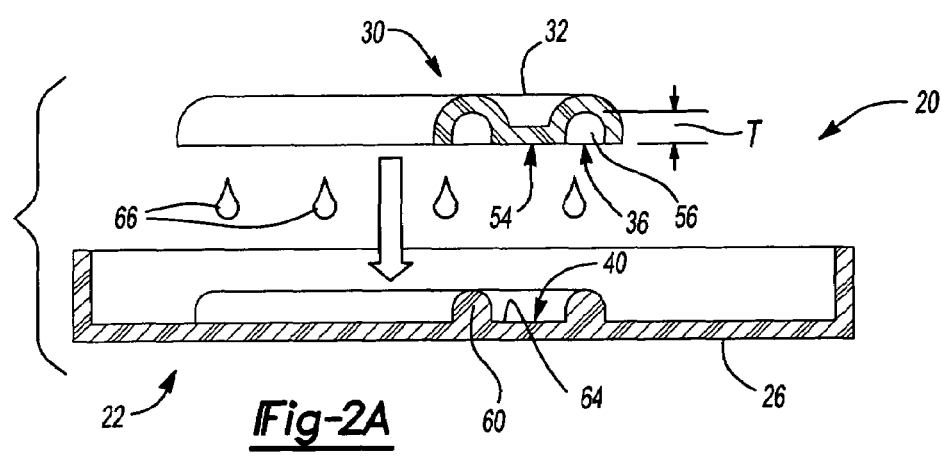
FIG. 2A illustrates a sectional view of the seat back of FIG. 1 during application of the reinforcement.
Figure 2B:
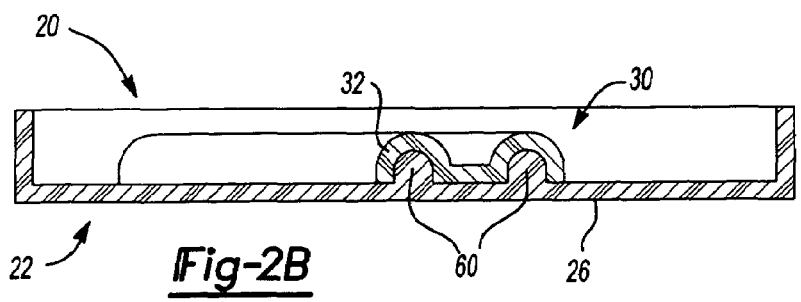
FIG. 2B illustratres a sectional view of the seat back of FIG. 1 after application of the reinforcement.

Referring to FIGS. 1, 2A and 2B, there is illustrated an improved seat back system 20. The seat back system 20 typically includes one or more panels 22 (e.g., a 60/40 split, a full seat or the like) that span a lateral distance of the seat back system 20. Preferably, each of the one or more panels 22 include a main wall 26 and, preferably, only one main wall 26 as will be further described below.

Each of the one or more panels of the seat back will include, one or more reinforcement structures (e.g., reinforcements, ribs, combinations thereof or the like) attached to and extending at least partially away from the wall. Preferably, the main wall of each panel spans substantially continuously between an entire periphery of the panel with the reinforcement structures extending substantially along the wall. It is preferable that the reinforcement structures include at least one reinforcement that is formed of a secondary material different than the wall. It is contemplated however that such a reinforcement may be formed of a similar or same material as the wall or seat back. As used herein, a secondary material refers to a material or combination of materials that is at least slightly compositionally different from the material of the seat back.

The panels of the seat back may be formed of any suitable material, including but not limited to metal, plastic (including reinforced or unreinforced plastic), other composite material or otherwise. Preferably, at least one of the panels is plastic. More preferably, all of the panels are plastic (e.g., thermoplastic, thermoset or combination thereof).

It is contemplated that a reinforcment structure according to the present invention may include one or more separately formed reinforcements of a material that differs in composition or form from the panels.

The employment of microcellular foam plastics is also contemplated within the scope of the present invention. In accordance therewith, a gas/polymer solution is formed, and the solution is rendered thermodynamically unstable in order to nucleate microvoids. The growth of nuclei is then controlled as desired.

It is possible to make seat back panels using art-disclosed techniques for the fabrication of the material selected. Thus, for example, the panels may be formed, molded, machined or otherwise configured to the desired shape. Where the panels are plastic, it is possible to use any suitable plastic fabrication technique including, without limitation, injection molding (including but not limited to external or internal gas injection molding), blow molding, compression molding, rotational molding, thermoforming, extruding, vacuum forming, foaming-in-place, or otherwise. One or more other fabrication techniques can also be employed such as insert molding, over-molding or a combination thereof. Accordingly, as can be appreciated, in one embodiment, hybrid seat assemblies can be fabricated, thereby taking advantage of the benefits of different respective materials and different respective fabrication techniques, and also advantageously permitting for the ability to design additional features.

The present invention contemplates the use of the reinforcement structures for imparting additional rigidity, toughness or impact resistance to a seat back assembly, or otherwise locally modifying the bending moment of a structure.

Examples of structures or patterns for reinforcement structures may include, without limitation, the "C" shape, "D" shape, "H" shape, "I" shape, "J" shape, "L" shape, "M" shape, "N" shape, "O" shape, "S" shape, "T" shape, "U" shape, "V" shape, "W" shape, "X" shape, "Y" shape, "Z" shape, curves (e.g. sinusoidal curves), zig zags, "+" shape, or the like.

In one preferred embodiment, the reinforcement structures of the panels are reinforcements formed of a secondary material and attached to the seat back. The reinforcements of the panels for the seat back may be configured as desired for reinforcing the main wall of the seat back and such configuration may depend upon the design (e.g., shape, size, strength requirements or the like) of the seat back for any particular vehicle. For example, the reinforcements may be substantially planar or contoured and may be large or small and short or long depending upon the design of the seat back. Moreover, there may be as many or as few reinforcements as required or desired.

In one highly preferred embodiment, the reinforcement structures may include one or more reinforcements such as ribs formed of an integral material. As an example, such ribs may be provided as solid or channel forming structures that are attached to the main wall of the seat back. Preferably, for channel forming ribs, such ribs are formed by gas assist injection molding as describe in commonly owned patent application Ser. No. 60/414,040 (filed Sep. 27, 2002); the teachings of which are hereby expressly incorporated by reference herein for all purposes Referring again to FIGS. 1, 2A and 2B, there is illustrated the seat back system 20 includes at least one reinforcement structure 30 having a reinforcement 32 attached to the panel 22 of the system 20. Preferably, the reinforcement 32 is at least partially formed of a secondary material.

It is contemplated that the reinforcement 32 may be formed in a variety of shapes and configurations. For example, the reinforcement 32 may be flat or contoured, elongated or stout, geometric or otherwise shaped depending upon the desired manner of applying the reinforcement 32 to the seat back system 20 and the manner of reinforcing desired. In the particular embodiment illustrated, the reinforcement 32 is provided as an elongate countoured strip having a length (L), a width (W) and a thickness (T). While the length, width and thickness are illustrated as substantially constant, these dimensions may be varied for different reinforcements and the dimensions may vary for a single reinforcement.

Generally, the numerical values for the dimensions of the reinforcement 32 are not narrowly critical and can depend upon the distance or area over which a reinforcement 32 is to span. However, it is typically desirable to maintain smaller dimensions and particularly a smaller thickness for maintaining lower weight for the reinforcement 32. Accordingly, the thickness is preferably less than about 5 mm, more preferably less than about 2 mm and even more preferably less than about 1 mm. It may also be preferable to form the reinforcement 32 with one or a plurality of voids (e.g., through-holes) for lowering the weight of the reinforcement 32. In such an embodiment, the reinforcement 32 may be substantially skeletal such that the voids defined in the reinforcement 32 occupy a greater volume that the secondary material of the reinforcement 32.

The reinforcement 32 preferably includes a mating or corresponding surface 36 that corresponds to (e.g., mirrors) a mating or corresponding surface 40 of the panel 22 of the seat back system 20, although not required. The reinforcement 22 in FIGS. 1-2B includes a pair of ribs 50 extending along the length (L) of the reinforcement 32 and a web 52 interconnecting the ribs 50 thereby forming the surface 36 to include a planar portion 54 and a pair of channels 56. For correspondence, mating surface 40 of the panel 22 of the seat back system 20 defines a pair of reinforcements 60 shown as ribs configured to extend into the channels 52 and a planar portion 64 configured to fit substantially flush against the planar portion 54 of the reinforcement 32.

The secondary material of the reinforcement 32 may be selected from a variety of materials such as polymers, glass, metals, fiber-based materials (e.g., glass, carbon fiber, aramid metal or otherwise), woven materials, unwoven materials, combinations thereof or the like. In one preferred embodiment, the secondary material is at least partially or substantially entirely formed of one or more metals such as aluminum, iron, tungsten, magnesium, steel, tin, copper, titanium, combinations thereof or the like. According to one preferred embodiment, the secondary material of the reinforcement is substantially entirely low carbon steel.

The reinforcement 32 may be formed using a variety of techniques. For example, the reinforcement 32 may be roll formed, cast, stamped or the like. The reinforcement may also be molded, extruded or the like.

Suitably the panel can comprise a plastic molding. The plastics material preferably comprises a homopolymer, for example a polyolefin, a polyamide, a polyphenylene oxide and polystyrene, or a copolymer, for example a polyalkylene terephthalate, having a low surface energy although higher surface energies are also possible.

Preferred plastics materials include polypropylene, polyamide, polyamide alloys, polyphenylene oxide polymers, polyphenylene oxide alloys, polystyrene polymers, polystyrene alloys, polybutylene terephthalate polymers and polybutylene terephthalate alloys. The plastics material may contain fibre, for example short glass fibre, long glass fibre, short natural fibre or long natural fibre.

Especially preferred plastics materials include short glass fibre filled polypropylene, long glass fibre filled polypropylene, glass filled polyamide and glass filled polyamide alloys.—Plastics materials which are especially preferred for use in bumper systems as the EAU include unfilled polypropylene, talc filled polypropylene, mineral filled polypropylene]

In certain preferred embodiments, the polymeric materials may include fibers for additional strength. Although it is contemplated that fibers of various sizes (e.g., lengths) may be employed, advantageously, it has been found that relatively long glass fibers add a relatively high degree of strength. Thus, in preferred embodiments, a polymeric material such as ABS, PCABS, polypropylene, SMA (styrene maleic anhydride), PPO (polyphenylene oxide) or another suitable plastic is filled with glass fibers having an average length of approximately greater than 2 mm, more preferably greater than about 4 mm even more preferably greater than about 6 mm and most preferably between about 8 mm and 20 mm.

The reinforcement 32 may be attached to or integrated with the rest of the seat back system 20 using a variety of integration or attachment techniques for forming the reinforcement structure 30. For example, mechanical fasteners such as screws, clips, rivets combinations thereof or the like may be employed. Alternatively, the reinforcement 32 may be integrated with the seat back system 20 by molding at least a portion of the seat back system 20 about the reinforcement 32 according to one of the molding techniques described herein. As other alternatives heat staking, vibrational welding, sonic welding, combinations thereof or the like may be used to attach the reinforcement 32 to the panel 22.

In one embodiment, the reinforcement 32 is adhered to the panel 22 of the seat back system 20 with an adhesive 66. Preferably, the adhesive 66 is applied to one or both of the mating surfaces 40, 36 respectively of the panel 22 and the reinforcement 32. Thereafter, the surfaces 40, 36 are pressured toward each other such that the surfaces 40, 36 and, thus, the reinforcement 32 and the panel 22 are attached to each other. Of course, it is contemplated that the adhesive 66 may be applied to any surfaces of the reinforcement 32 or the seat back system 20 for adhering the reinforcement 32 to the seat back system 20.

Any suitable adhesive may be employed in the present invention. Preferably, the adhesive 66 is compatible with (i.e., capable of adhering to) the material of the panel 22 and the secondary material of the reinforcement 32. If, however, the adhesive 66 is incompatible with one of these materials, it may be desirable to treat the surface[s] of the panel 22 or the reinforcement 32 formed of the incompatible material. Exemplary treatments include the application of primer, exposure to plasma, combinations thereof or the like.

In one embodiment, the adhesive is a urethane based adhesive, and more preferably a urethane adhesive (e.g., a polyurethane adhesive). Alternatively, the adhesive may include a functional component selected from methyl methacrylate (MMA), acrylonitrile butadiene styrene (ABS), polycarbonate (PC), or a mixture thereof (e.g. PC-ABS). In a further alternative embodiment the adhesive is a silane adhesive, a silicone adhesive or a mixture thereof. In yet another embodiment, the adhesive is an acrylic adhesive. The adhesive may also be epoxy based. It may include polyolefinics, styrenics, acrylics or mixtures thereof. In yet another embodiment, a preferred adhesive includes alkyl borane. Examples of suitable adhesives are disclosed in commonly owned U.S. Pat. No. 09/466,321 (filed Dec. 17, 1999) and patent publication numbers 20020058764 and 20030001410 expressly incorporated herein by reference for all purposes. Any such adhesive may include suitable performance modifiers including art disclosed tackifiers, elastomers, impact modifiers, or the like.

In one highly preferred embodiment, a two part, organoborane/amine comples adhesive or other adhesive is employed for adhesively securing the reinforcement 32 to the panel portion 22. Advantageously, it has been found that the adhesive is compatible with metal (e.g., steel) and plastic, particularly polypropylene. As such, the adhesive may be used for attaching the reinforcement 32, when formed of metal, to the seat back system 20, when formed of plastic or polypropylene, without having to treat any surfaces of the reinforcement 32 or seat back system 20 prior to adhesion.

An especially preferred embodiment of the invention provides a panel made of a molded glass filled polypropylene and/or glass filled polyamide having a surface energy of less than 45 mJ/m$^2$, and a reinforcement made from steel, zinc and/or aluminium. As such, the adhesive which is preferably capable of bonding to a substrate having a surface energy of less than 45 mJ/m$^2$ is disposed between at least part of the corresponding surfaces so as to bond them together, the adhesive being derived from a polymerizable composition comprising i) an organoborane/amine complex;
ii) one or more of monomers, oligomers or polymers having olefinic unsaturation which is capable of polymerization by free radical polymerization; and, optionally
iii) a compound which causes the said complex to dissociate so as to release the borane to initiate polymerization of one or more of monomers, oligomers or polymers having olefinic unsaturation.

Additional especially preferred aspects of the invention are a method of making the automobile assembly referred to in the preceding paragraph and use of an adhesive described in that paragraph in fabricating the assembly described in it.

Adhesives and polymerizable compositions disclosed in International Patent Application No. PCT/US00/33806 are especially preferred for use in the present invention to bond the structural member and reinforcing member together.

The amines used to complex the organoborane compound can be any amines which complex the organoborane and which can be decomplexed when exposed to a decomplexing agent. Preferred amines include the primary or secondary amines or polyamines containing primary or secondary amine groups, or ammonia, as disclosed in Zharov U.S. Pat. No. 5,539,070 at column 5 lines 41 to 53, incorporated herein by reference, Skoultchi U.S. Pat. No. 5,106,928 at column 2 line 29 to 58 incorporated herein by reference, and Pocius U.S. Pat. No. 5,686,544 column 7, line 29 to Column 10 line 36 incorporated herein by reference; monthanolamine, secondary dialkyl diamines or polyoxyalkylenepolyamines; and amine terminated reaction products of diamines and compounds having two or more groups reactive with amines as disclosed in Deviny U.S. Pat. No. 5,883,208 at column 7 line 30 to column 8 line 56, incorporated herein by reference. With respect to the reaction products described in Deviny the preferred diprimary amines include alkyl diprimary amines, aryl diprimary amines, alkyaryl diprimary amines and polyoxyalkylene diamines; and compounds reactive with amines include compounds which contain two or more groups of carboxylic acids, carboxylic acid esters, carboxylic acid halides, aldehydes, epoxides, alcohols and acrylate groups. Preferred amines include n-octylamine, 1,6-diaminohexane (1,6-hexane diamine), diethylamine, dibutyl amine, diethylene triamine, dipropylene diamine, 1,3-propylene diamine (1,3-propane diamine), 1,2-propylene diamine, 1,2-ethane diamine, 1,5-pentane diamine, 1,12-dodecanediamine, 2-methyl-1,5-pentane diamine, 3-methyl-1,5-pentane diamine, triethylene tetraamine, diethylene triamine. Preferred polyoxyalkylene polyamines include polyethyleneoxide diamine, polypropyleneoxide diamine, triethylene glycol propylene diamine, polytetramethyleneoxide diamine and polyethyleneoxidecopolypropyleneoxide diamine.

In particular, the amine in the organoborane/amine complex is suitably selected from the group of amines having an amidine structural component; aliphatic heterocycles having at least one nitrogen in the heterocyclic ring wherein the heterocyclic compound may also contain one or more nitrogen atoms, oxygen atoms, sulphur atoms, or double bonds in the heterocycle; primary amines which in addition have one or more hydrogen bond accepting groups wherein there are at least two carbon atoms, preferably at least three carbon atoms, between the primary amine and the hydrogen bond accepting group, such that due to inter- or intramolecular interactions within the complex the strength of the B—N bond is increased; and conjugated imines.

Preferred hydrogen bond accepting groups include the following: primary amines, secondary amines, tertiary amines, ethers, halogens, polyethers or polyamines. Heterocycle as used herein refers to a compound having one or more aliphatic cyclic rings of which one of the rings contains nitrogen. The amidines or conjugated imines may be straight or branched chain or cyclic.

Desirably, the organoborane used in the complex is a trialkyl borane or an alkyl cycloalkyl borane. Preferably this borane corresponds to Formula 1:

$$B-(R_1)_3 \qquad \text{Formula 1}$$

wherein B represents boron; and $R_1$ is separately in each occurrence a $C_{1-10}$ alkyl, $C_{3-10}$ cycloalkyl, or two or more of $R_1$ may combine to form a cycloaliphatic ring.

Preferably $R_1$ is $C_{1-4}$ alkyl, even more preferably $C_{2-4}$ alkyl and most preferably $C_{3-4}$ alkyl. Among preferred organoboranes are tri-ethyl borane, tri-isopropyl borane and tri-n-butylborane.

In a preferred embodiment, the amine part of the complex comprises a compound having a primary amine and one or more hydrogen bond accepting groups, wherein there are at least two carbon atoms, preferably at least about three, between the primary amine and hydrogen bond accepting groups.

Preferably, the amine corresponds to Formula 2:

$$NH_2(CH_2)_b(C(R_2)_2)_aX \qquad (2)$$

wherein $R_2$ is separately in each occurrence hydrogen or a $C_{1-10}$ alkyl or $C_{3-10}$ cycloalkyl; X is hydrogen bond accepting moiety; a is an integer of 1 to 10; and b is separately in each occurrence an integer of 0 to 1, and the sum of a and b is from 2 to 10.

Preferably $R_2$ is hydrogen or methyl.

Preferably X is separately in each occurrence a hydrogen accepting moiety and, when the hydrogen accepting moiety is an amine, it is preferably a tertiary or a secondary amine. More preferably X is separately in each occurrence —N(R_2)_e, —OR_{10}, or a halogen wherein $R_8$ is separately in each occurrence $C_{1-10}$ alkyl, $C_{3-10}$ cycloalkyl or —(C(R_2)_2)_d —W; $R_{10}$ is separately in each occurrence, $C_{1-10}$ alkyl, $C_{3-10}$ cycloalkyl, or —(C(R_2)_2)_d—W; and e is 0, 1, or 2. More preferably X is —N(R_8)_2 or—OR_{10}.

Preferably, $R_8$ and $R_{10}$ are $C_{1-4}$ alkyl or —(C(R_1)_2)_d—W, more preferably $C_{1-4}$ alkyl and most preferably methyl. W is separately in each occurrence hydrogen or $C_{1-10}$ alkyl or X and more preferably hydrogen or $C_{1-4}$ alkyl.

Preferably, a is about 1 or greater and more preferably 2 or greater. Preferably a is about 6 or less, and most preferably about 4 or less. Preferably, b is about 1. Preferably, the sum of a and b is an integer about 2 or greater and most preferably about 3 or greater. Preferably the sum of a and b are about 6 or less and more preferably about 4 or less. Preferably d is separately in each occurrence an integer of 1 to 4, more preferably 2 to 4, and most preferably 2 to 3.

Among preferred amines corresponding to Formula 2 are dimethylaminopropyl amine, methoxypropyl amine, dimethylaminoethylamine, dimethylaminobutylamine, methoxybutyl amine, methoxyethyl amine, ethoxypropylamine, propoxypropylamine, amine terminated polyalkylene ethers (such as trimethylolpropane tris(poly(propyleneglycol), amine terminated)ether), aminopropylmorpholine, isophoronediamine, and aminopropylpropanediamine.

In another embodiment, the amine may be an aliphatic heterocycle having at least one nitrogen in the heterocycle. The heterocyclic compound may also contain one or more of nitrogen, oxygen, sulfur or double bonds. In addition, the heterocycle may comprise multiple rings wherein at least one of the rings has a nitrogen in the ring. Preferred compounds of this type include morpholine, piperidine, pyrolidine, piperazine, 1,3,3 trimethyl 6-azabicyclo[3,2,1]octane, thiazolidine, homopiperazine, aziridine, 1,4-diazabicylo[2.2.2]octane (DABCO), 1-amino-4-methylpiperazine, and 3-pyrroline.

In yet another embodiment, the amine which is suitably complexed with the organoborane is an amidine. Any compound with amidine structure wherein the amidine has sufficient binding energy as described hereinbefore with the organoborane, may be used. Among preferred amidines are 1,8diazabicyclo[5,4]undec-7-ene; tetrahydropyrimidine; 2-methyl-2-imidazoline; and 1,1,3,3-tetramethylguanidine.

In a further embodiment, the amine which is complexed with the organoborane is suitably a conjugated imine. Any compound with a conjugated imine structure, wherein the imine has sufficient binding energy with the organoborane as described in International Patent Application No. PCT/US00/33806 may be used. The conjugated imine can be a straight or branched chain imine or a cylic imine. Among preferred conjugated imines are 4-dimethylaminopyridine; 2,3-bis(dimethylamino)cycl-opropeneimine; 3-(dimethylamine)acroleinimine; 3-(dimethylamino)methacrole-inimine.

Preferably the molar ratio of amine compound to organoborane compound is from 1.0:1.0 to 3.0:1.0. Below the ratio of about 1.0:1.0 there may be problems with polymerization, stability of the complex and adhesion. Greater than about a 3.0:1.0 ratio may be used although there may not be additional benefit from using a ratio greater than about 3.0:1.0. If too much amine is present, this may negatively impact the stability of the adhesive or polymer compositions. Preferably the molar ratio of amine compound to organoborane compound is from 2.0:1.0 to 1.0:1.0.

The organoborane amine complex may be readily prepared using known techniques, for example as described or referred to in International Patent Application No. PCT/US00/33806.

Preferably, the polymerizable material comprises acrylate and/or methacrylate based compounds. Especially preferred acrylate and methacrylate compounds include methylmethacrylate, butylmethacrylate, ethylhexylmethacrylate, isobornylmethacrylate, tetrahydrofurfuryl methacrylate, and cyclohexylmethylmethacrylate.

The polymerizable composition may further comprise an effective amount of a compound that is reactive with an amine so as to liberate the organoborane so as to initiate polymerization (a disassociating agent). Desirable amine reactive compounds are those materials that can readily form reaction products with amines at or below and more preferably at room temperature so as to provide a composition that can be generally easily used and cured under ambient conditions. General classes of these compounds include acids, aldehydes, isocyanates, acid chlorides, sulphonyl chlorides, mixtures thereof and the like. Preferred amine reactive compounds are acids, especially Bronsted and Lewis acids and those described in U.S. Pat. No. 5,718,977 and, more desirably acrylic acid and methacrylic acid.

In the polymerizable composition, suitably at least 20% by weight, preferably at least 30% by weight and especially at least 40% by weight of the composition comprises the polymerizable component. Independently, the polymerizable component is suitably present at a level not exceeding 95%, preferably not exceeding 90% and especially not exceeding 85% by weight of the composition.

Suitably, the organoborane/amine complex is present at a level of at least 0.2%, preferably at least 1% and more preferably at least 2% by weight of the composition. Independently, the complex is suitably present at a level not exceeding 8%, preferably not exceeding 6% and especially not exceeding 4% by weight of the composition.

If present, the disassociating compound is present at a level of at least 1%, preferably at least 1.5% and more preferably at least 2% by weight of the composition. Independently, the disassociating compound is suitably present at a level not exceeding 8%, preferably not exceeding 6% and especially not exceeding 4% by weight of the composition.

The adhesive to be employed in the present invention suitably is capable of providing a bond between a 30% glass filled polypropylene structural member and the reinforcing member without the structural member having been subjected to any surface treatment when tested in accordance with the procedure set out in ASTM D1002. Preferably, the adhesive provides a bond when tested under this regime including in addition being subjected to thermal cycling and high humidity. Thermal cycling in this context suitably includes cycling over a range from −40.degree. C. to greater than 120.degree. C. Humidity levels can vary from dry to fully saturated.

The adhesive may be used in the manner set out in International Patent Application No. PCT/US00/33806. Optionally, further components may be included as additives in the composition. Suitable additives include those set out in International Patent Application No. PCT/US00/33806.

The assembly suitably is able to withstand exposure to heat at a temperature of 100° C. and suitably at up to 120° C. or more. Further, the assembly desirably should also be able to withstand loads applied during production and also imposed in use, for example by slamming the bonnet, application of load to the bonnet latch and vibration and fatigue during use due to displacement from the road surface. The amount and location of adhesive is suitably selected having regard to the design and structure of the automobile to which the application applies.

Once the adhesive 66 and the reinforcement 32 have been applied to the seat back system 20, the adhesive 66 will typically require some amount of time to cure (e.g., part cure, full cure, cure on demand, air cure, heat cure, moisture cure, chemical cure, light cure, or the like) for securing the reinforcement 32 to the panel 26. Preferably, the adhesive cures at about room temperature (e.g., between about 20° C. to about 30° C.), but may be exposed to elevated or lowered temperatures for accelerating or slowing cure times. During cure, it may be desirable to apply fasteners (e.g., push-pins, clips or the like) to the reinforcement 32 for securing the reinforcement 32 to the seat back system 20. Such fasteners may be removable or may be intended to assist in securing the reinforcement 32 to the seat back system 20 during use of the seat back system 20 as well.

Generally, it is desirable for the adhesive to exhibit a reasonable amount of post-cure ductility. Preferably, the adhesive exhibits ductility that is as high as the ductility of material that forms the reinforcement 32 or the material that forms the seat back system 20 or panel 22, whichever ductility is lower. More preferably, however, the adhesive 66 exhibits ductility that is as high as the ductility of material that forms the reinforcement 32 or the material that forms the seat back system 20, whichever ductility is higher.

Advantageously, it has been found that lower cycle times for forming seat backs with reinforcement structure have a reinforcement formed of secondary material can be achieved according to the present invention. For example, these seat back systems can be formed with cycle times of less than a minute, more preferably less than about 40 seconds, even more preferably less than about 30 seconds and still more preferably less than about 20 seconds.

In the embodiment depicted in FIGS. 1-2B, the reinforcement 32 is attached to a back side of the seat back system 20 (i.e., a side intended to face away from a passenger being supported by the seat back). However, one or more reinforcement structures having a reinforcement such as that shown may be located in a variety of locations on or within the seat back system. One or more additional of these reinforcement structures may be located on the back side of a seat back panel. One or more of these reinforcements may be located on the front side or may be integrated within a seat back panel. As another alternative, one or more these reinforcements may extend along the peripheral edges of the seat back panel. It is also contemplated that one or more of these reinforcements may extend across the seat back panel either laterally, longitudinally, horizontally, vertically, diagonally or combinations thereof.

In the embodiment depicted, the reinforcement 32 is attached to the integral reinforcement of the seat back system 20. However, reinforcements such as the reinforcement 32 shown may also be placed within openings (e.g., cavities or through-holes) or upon substantially planar surfaces.

Figure 3:
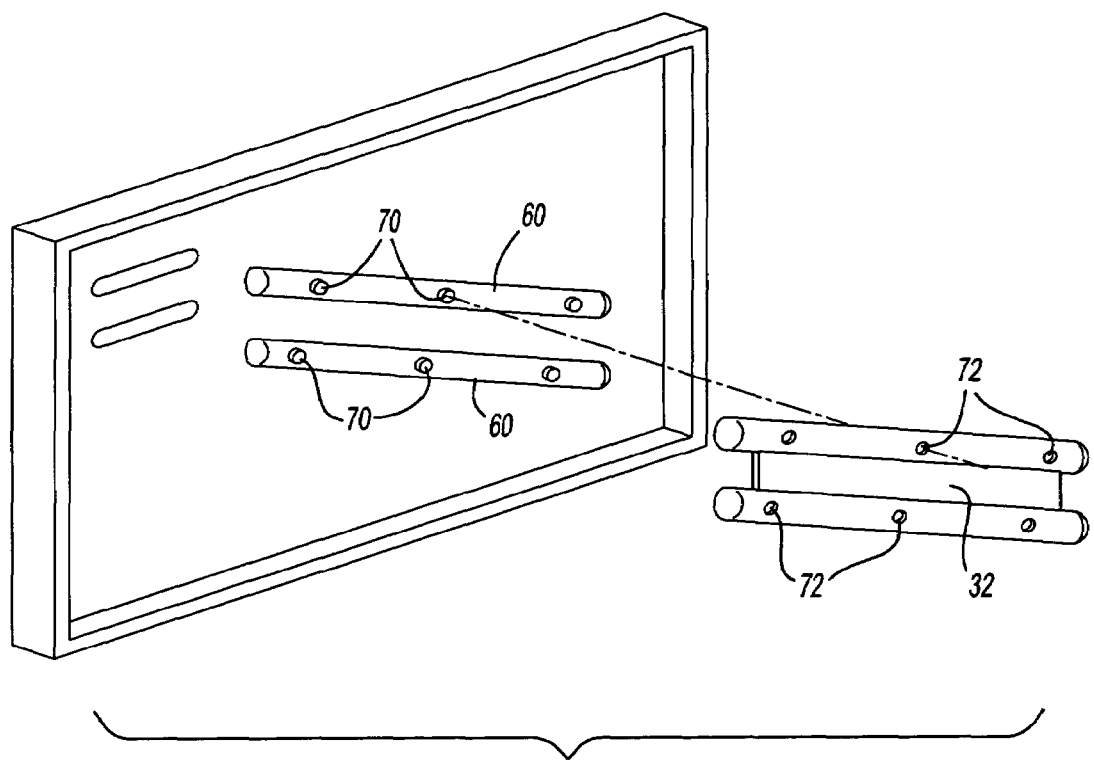
FIG. 3 is a perspective view of an alternative seat back during application of an alternative reinforcement.

A seat back panel, a reinforcement or both according to the present invention may include one or more protrusions for assisting in locating the reinforcement relative to the seat back, for assisting in attaching the reinforcement to the seat back panel. Preferably, such protrusions are configured to be inserted in corresponding openings (e.g., cavities or through-holes), which may be formed in either the reinforcement, the seat back panel or both. In FIG. 3, a plurality of protrusions 70 extend from the ribs 60 and the protrusions 70 are configured for insertion into through-holes 72 formed in the reinforcement 32.

The design and location of each reinforcement structure or pattern fabricated in the seat back may be optimized for each individual application, taking into account some or all of the following criteria. For each application, the skilled artisan will appreciate that the specific reinforcement structure employed is configured to help minimize the bending or hinge effect caused by loads resulting from rapid deceleration or acceleration of a vehicle in the presence of a passenger or cargo behind a seat (e.g., that which experienced by a top mounted center shoulder belt, top mounted child seat anchors, and luggage intrusion). For instance, in one preferred embodiment, the reinforcement structure and pattern selected generally is one that will position a portion of the reinforcement structure having a higher bending moment in a position generally perpendicular to the torsional bending diagonal plane.

In addition to the foregoing, it is contemplated the seat back system of the present invention may be employed in a front seat, a rear seat, a folding seat or the like. It is also contemplated the system may be configured to accommodate a child safety seat tether, a rear center shoulder belt or the like. Moreover, the system may be configured to meet predetermined standards (e.g., strength standards). A further discussion of such seats, tethers, belt and standards can be found in U.S. patent application Ser. No. 60/414,040, already incorporated herein by reference.

The skilled artisan will recognize that although the seating system of the present invention has been described in relation to automotive seating, the system may also be used for other seats such as airplane and bus seats or auditorium and stadium seats.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims. In particular regard to the various functions performed by the above described components, assemblies, devices, compositions, etc., the terms used to describe such items are intended to correspond, unless otherwise indicated, to any item that performs the specified function of the described item, even though not necessarily structurally equivalent to the disclosed structure. In addition, while a particular feature of the invention may have been described above with respect to only one of the embodiments, such feature may be combined with one or more other features of other illustrated embodiments.

What is claimed is:

1. A method of forming an automotive seatback system, comprising:
   providing a first panel having a main wall;
   providing a reinforcement positioned upon the first panel wherein:
   i) the first panel is formed of a plastic material, the first panel having at least one corresponding surface; and
   ii) the reinforcement is formed of a secondary material, the secondary material being a metal, the reinforcement having at least one corresponding surface;
   adhering the corresponding surface of the reinforcement to the corresponding surface of the first panel with an adhesive; and
   locating the first panel within an automotive vehicle as part of a seat back;
   wherein the reinforcement extends substantially from side to side along and across the main wall; and
   wherein the seat back is adjustable within the vehicle.

2. A method according to claim 1 wherein at least one of the corresponding surface of the reinforcement and the corresponding surface of the first panel is a low energy surface and wherein the adhesive is capable of bonding to a low energy surface and wherein the low energy surface is a plastic having a surface energy of less than 45 mJ/m$^2$.

3. A method according to claim 1 further comprising applying the adhesive directly to the corresponding surface of the panel without treatment or priming of the said corresponding surface of the panel.

4. A method according to claim 1 wherein the adhesive comprises an organoborane/amine complex and one or more of monomers, oligomers or polymers having olefinic unsaturation which is capable of polymerization by free radical polymerization.

5. A method according to claim 1 wherein the corresponding surface of the reinforcement defines one or more contours corresponding to one or more contours defined by the corresponding surface of the panel.

6. A method according to claim 1 wherein the cycle time for formation of the seatback system is less than 40 seconds.

7. The method according to claim 1 wherein the reinforcement extends substantially from top to bottom along and across the main wall.

8. A method of forming an automotive seatback system, comprising:
   providing a first panel having a main wall;
   providing a reinforcement positioned upon the first panel wherein:
   i) the first panel is formed of a plastic material in which the plastic material includes a filler selected from glass fibre or natural fibre and in which the plastic material comprises a polymer selected from a polyolefin, a polystyrene, a polyamide, a polybutylene terephthalate, an acrylonitrile butadiene styrene, a polycarbonate or a combination thereof, the first panel having at least one corresponding surface; and
   ii) the reinforcement is formed of a secondary material, the secondary material being a metal, the reinforcement having at least one corresponding surface;
   adhering the corresponding surface of the reinforcement to the corresponding surface of the first panel with an adhesive; and
   locating the first panel within an automotive vehicle as part of a seat back;
   wherein the reinforcement extends substantially from side to side along and across the main wall.

9. A method according to claim 8 wherein at least one of the corresponding surface of the reinforcement and the corresponding surface of the first panel is a low energy surface and wherein the adhesive is capable of bonding to a low energy surface and wherein the low energy surface is a plastic having a surface energy of less than 45 mJ/m$^2$.

10. A method according to claims 8 in which the plastics material is selected from short glass fibre filled polypropylene, long glass fibre filled polypropylene, glass filled polyamide and glass filled polyamide alloys.

11. A method according to claim 8 wherein the reinforcement and its corresponding surface is made of a metal selected from steel, aluminum or a combination thereof.

12. A method according to claim 8 further comprising applying the adhesive directly to the corresponding surface of the panel without treatment or priming of the said corresponding surface of the panel.

13. A method according to claim 8 wherein the panel and the corresponding surface of the panel is formed of polypropylene or polyamide.

14. A method according to claim 8 wherein the adhesive comprises an organoborane/amine complex and one or more of monomers, oligomers or polymers having olefinic unsaturation which is capable of polymerization by free radical polymerization.

15. A method according to claim 14 in which:
the polymerizable composition further comprises a compound which causes the complex to disassociate so as to release the organoborane to initiate polymerization of one or more of monomers, oligomers or polymers having olefinic unsaturation; or
the amine part of the organoborane/amine complex is selected from the group of amines having an amidine structural component; aliphatic heterocycles having at least one nitrogen in the heterocyclic ring; primary amines which in addition have one or more hydrogen bond accepting groups wherein there are at least two carbon atoms between the primary amine and the hydrogen bond accepting group; and conjugated imines; or
the amine is selected from dimethylaminopropyl amine, methoxypropyl amine, dimethylaminoethylamine, dimethylaminobutylamine, methoxybutyl amine, methoxyethyl amine, ethoxypropylamine, propoxypropylamine, amine terminated polyalkylene ethers (such as trimethylolpropane tris(poly(propyleneglycol), amine terminated)ether), aminopropylmorpholine, isophoronediamine, and aminopropylpropanediamine; or
the organoborane part of the organoborane/amine complex is selected from a trialkyl borane and an alkyl cycloalkyl borane.

16. A method according to claim 8 wherein the corresponding surface of the reinforcement defines one or more contours corresponding to one or more contours defined by the corresponding surface of the panel.

17. A method according to claim 16 wherein the one or more contours of the reinforcement are at least partially defined by ribs or cavities and the one or more contours of the of the panel are defined by ribs or cavities.

18. A method according to claim 8 wherein the panel is formed by a process selected from compression molding, injection molding or blow molding.

19. A method according to claim 8 wherein the cycle time for formation of the seatback system is less than 40 seconds.

20. A method of forming an automotive seatback system, comprising:
providing a first panel having a main wall;
providing a reinforcement positioned upon the first panel wherein:
i) the first panel is formed of a plastic material selected from a polyamide or a polypropylene and in which the plastics material includes fibre, the first panel having at least one corresponding surface; and
ii) the reinforcement is formed of a metal material, the reinforcement having at least one corresponding surface;
iii) the corresponding surface of the first panel is a low energy surface of less than 45 mJ/m$^2$; and
iv) the adhesive is capable of bonding to the corresponding surface of the first panel;
adhering the corresponding surface of the reinforcement to the corresponding surface of the first panel with an adhesive; locating the first panel within an automotive vehicle as part of a seat back;
wherein the reinforcement extends substantially from side to side along and across the main wall.

21. A method according to claim 20 in which the fibre is selected from short glass fibre, long glass fibre, short natural fibre or long natural fibre.

22. A method according to claims 20 in which the plastics material is selected from short glass fibre filled polypropylene, long glass fibre filled polypropylene, glass filled polyamide and glass filled polyamide alloys.

23. A method according to claim 20 wherein the reinforcement and it corresponding surface is made of a metal selected from steel, aluminium or a combination thereof.

24. A method according to claim 20 wherein the corresponding surface of the reinforcement defines one or more contours corresponding to one or more contours defined by the corresponding surface of the panel.

25. A method according to claim 20 wherein the cycle time for formation of the seatback system is less than 40 seconds.

26. A method according to claim 8 wherein the seat back is adjustable within the vehicle.

27. A method according to claim 8 wherein the seat system includes multiple panels spanning a lateral distance of the system with the automotive vehicle.

28. A method according to claim 20 wherein the adhesive comprises an organoborane/amine complex and one or more of monomers, oligomers or polymers having olefinic unsaturation which is capable of polymerization by free radical polymerization.

29. A method of forming an automotive seatback system, comprising:
providing a first panel having a main wall;
providing a reinforcement positioned upon the first panel wherein:
i) the first panel is formed of a plastic material selected from a polyamide or a polypropylene, the first panel having at least one corresponding surface formed of the plastic material, the first panel defining a rib extending along the main wall; and
ii) the reinforcement is formed of a metal material selected from aluminum or steel, the reinforcement having at least one corresponding surface formed of the metal material, the reinforcement defining a cavity that receives the rib of the first panel;
iii) the corresponding surface of the first panel is a low energy surface of less than 45 mJ/m$^2$; and
iv) the adhesive is capable of bonding to the corresponding surface of the first panel;
adhering the corresponding surface of the reinforcement to the corresponding surface of the first panel with an adhesive;
locating the first panel within an automotive vehicle as part of a seat back;
wherein the reinforcement extends horizontally, vertically or both substantially along and across the wall.

30. The method according to claim 8 wherein the reinforcement extends substantially from top to bottom along and across the main wall.

31. The method according to claim 8 wherein the first panel including the main wall spans across a lateral distance of the seatback system and wherein the reinforcement is positioned to be generally perpendicular to a torsional bending diagonal plane of the seatback.

32. The method according to claim 20 wherein the reinforcement extends substantially from top to bottom along and across the main wall.

33. The method according to claim 29 wherein the rib is co-extensive with the reinforcement and extends substantially from side to side and from top to bottom along and across the main wall and wherein the main wall extends substantially continuously between an entire periphery of panel and wherein the panel includes only one main wall.

34. A method of forming an automotive seatback system, comprising:
- providing a first panel having a main wall;
- providing a reinforcement positioned upon the first panel wherein:
  - i) the first panel is formed of a plastic material in which the plastics material is selected from short glass fibre filled polypropylene, long glass fibre filled polypropylene, glass filled polyamide and glass filled polyamide alloys, the first panel having at least one corresponding surface; and
  - ii) the reinforcement is formed of a secondary material, the secondary material being a metal, the reinforcement having at least one corresponding surface;
- adhering the corresponding surface of the reinforcement to the corresponding surface of the first panel with an adhesive; and
- locating the first panel within an automotive vehicle as part of a seat back;
- wherein the reinforcement extends substantially from side to side along and across the main wall.

35. A method according to claim 34 wherein at least one of the corresponding surface of the reinforcement and the corresponding surface of the first panel is a low energy surface and wherein the adhesive is capable of bonding to a low energy surface and wherein the low energy surface is a plastic having a surface energy of less than 45 mJ/m$^2$.

36. A method according to claim 34 further comprising applying the adhesive directly to the corresponding surface of the panel without treatment or priming of the said corresponding surface of the panel.

37. A method according to claim 34 wherein the adhesive comprises an organoborane/amine complex and one or more of monomers, oligomers or polymers having olefinic unsaturation which is capable of polymerization by free radical polymerization.

38. A method according to claim 34 wherein the corresponding surface of the reinforcement defines one or more contours corresponding to one or more contours defined by the corresponding surface of the panel.

39. A method according to claim 34 wherein the cycle time for formation of the seatback system is less than 40 seconds.

40. The method according to claim 34 wherein the reinforcement extends substantially from top to bottom along and across the main wall.

41. A method of forming an automotive seatback system, comprising:
- providing a first panel having a main wall;
- providing a reinforcement positioned upon the first panel wherein:
  - i) the first panel is formed of a plastic material, the first panel having at least one corresponding surface; and
  - ii) the reinforcement is formed of a secondary material, the secondary material being a metal, the reinforcement having at least one corresponding surface;
- adhering the corresponding surface of the reinforcement to the corresponding surface of the first panel with an adhesive; and
- locating the first panel within an automotive vehicle as part of a seat back;
- wherein the reinforcement extends substantially from side to side along and across the main wall;
- wherein the corresponding surface of the reinforcement defines one or more contours corresponding to one or more contours defined by the corresponding surface of the panel; and
- wherein the one or more contours of the reinforcement are at least partially defined by ribs or cavities and the one or more contours of the of the panel are defined by ribs or cavities.

42. A method according to claim 41 wherein at least one of the corresponding surface of the reinforcement and the corresponding surface of the first panel is a low energy surface and wherein the adhesive is capable of bonding to a low energy surface and wherein the low energy surface is a plastic having a surface energy of less than 45 mJ/m$^2$.

43. A method according to claim 41 further comprising applying the adhesive directly to the corresponding surface of the panel without treatment or priming of the said corresponding surface of the panel.

44. A method according to claim 41 wherein the adhesive comprises an organoborane/amine complex and one or more of monomers, oligomers or polymers having olefinic unsaturation which is capable of polymerization by free radical polymerization.

45. A method according to claim 41 wherein the corresponding surface of the reinforcement defines one or more contours corresponding to one or more contours defined by the corresponding surface of the panel.

46. A method according to claim 41 wherein the cycle time for formation of the seatback system is less than 40 seconds.

47. The method according to claim 41 wherein the reinforcement extends substantially from top to bottom along and across the main wall.

* * * * *